UNITED STATES PATENT OFFICE.

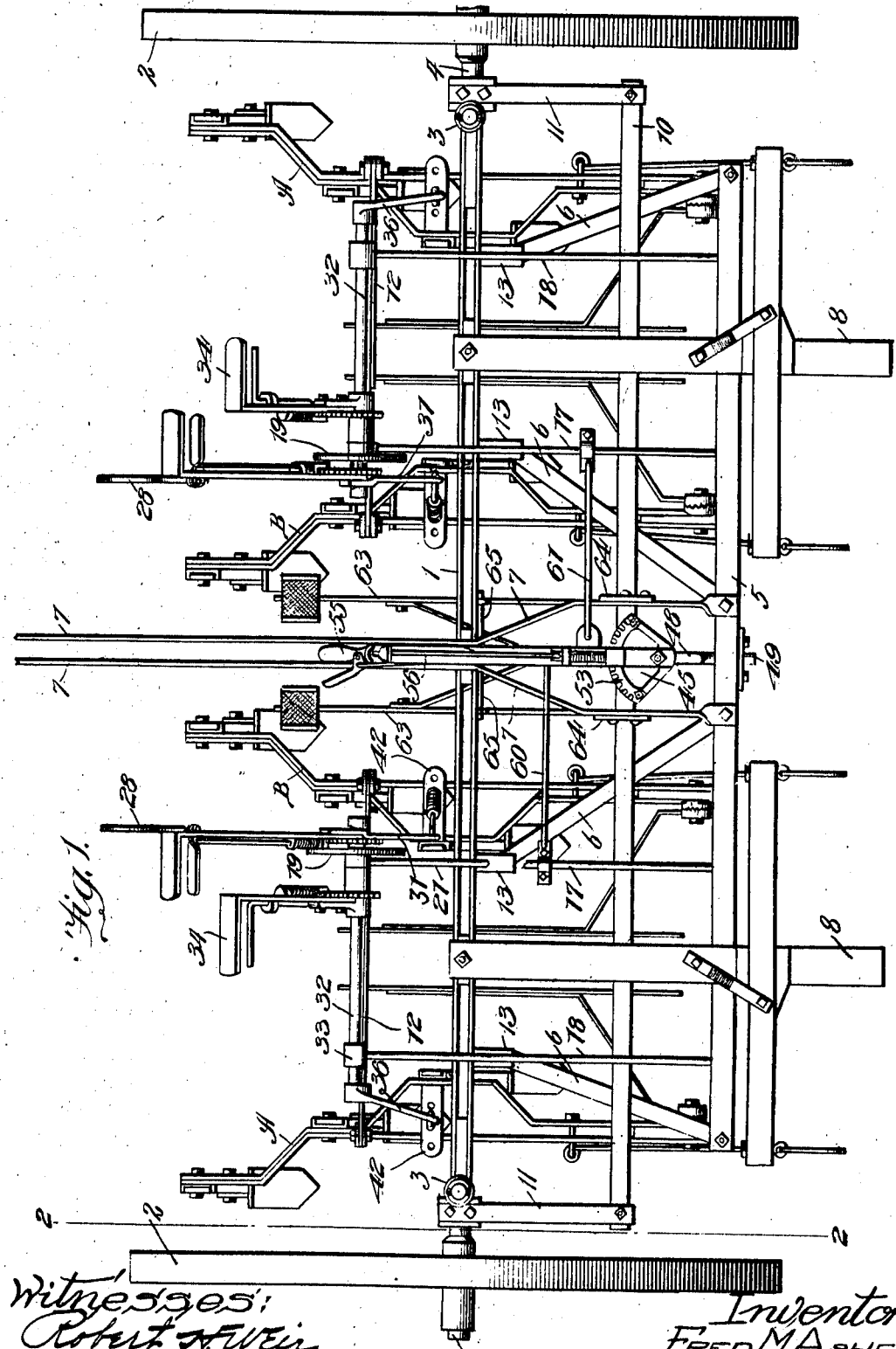

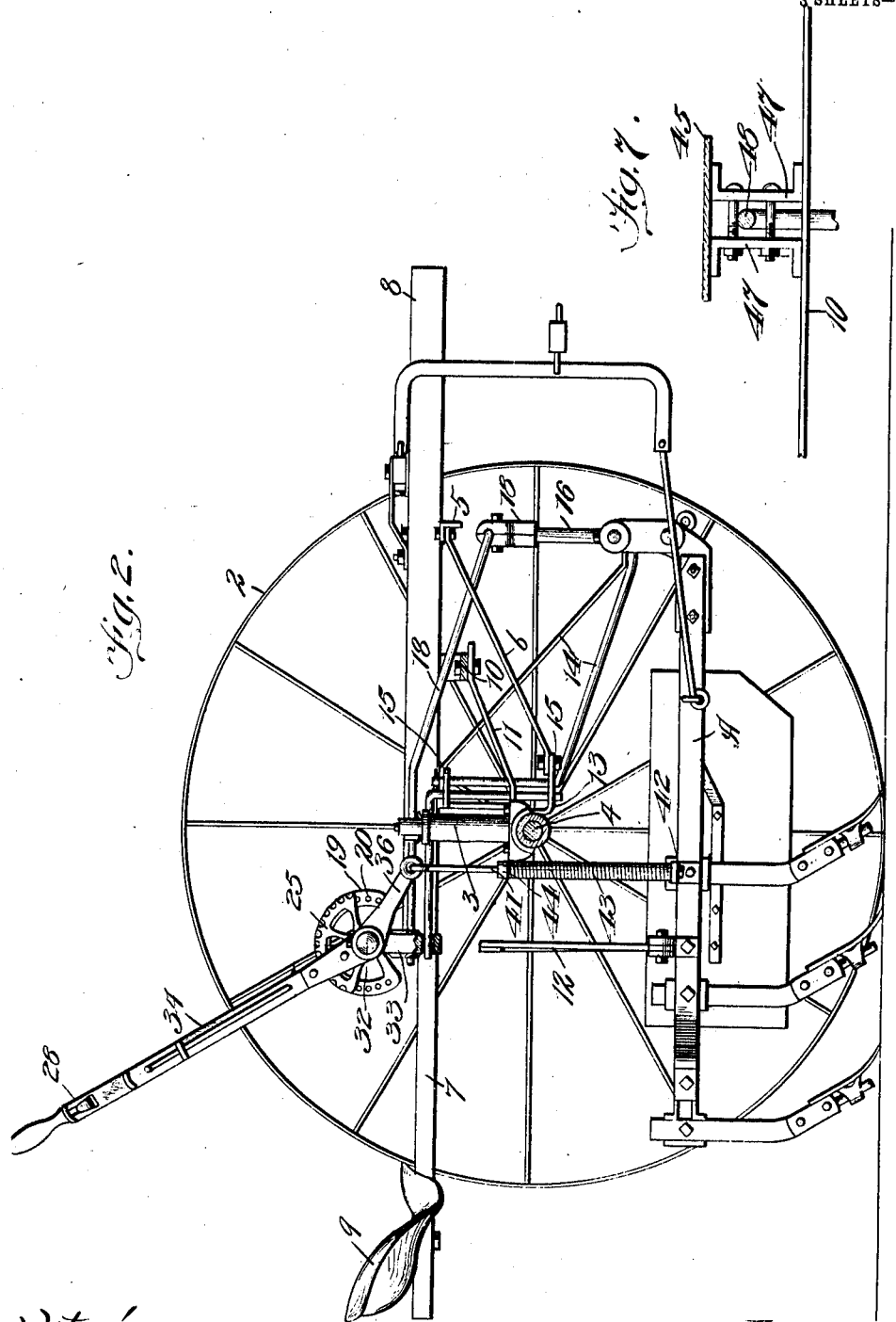

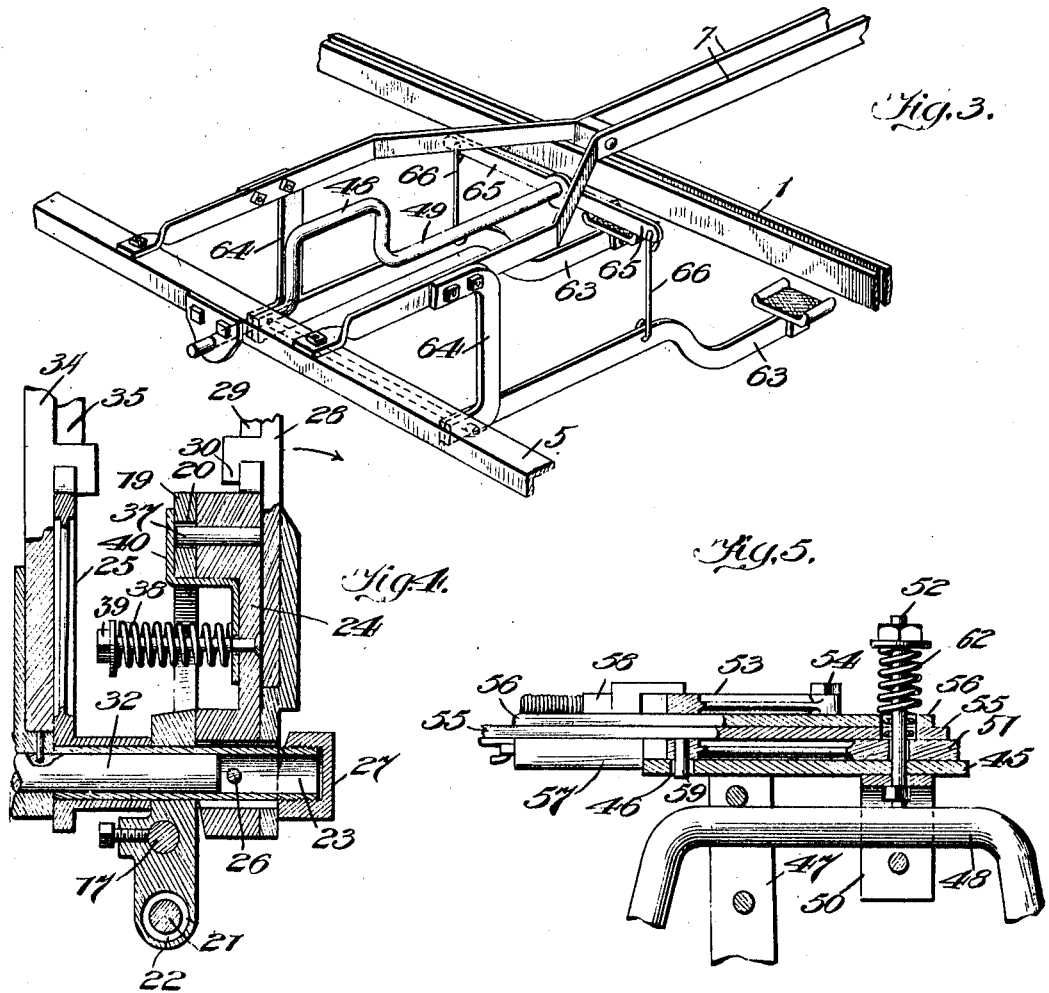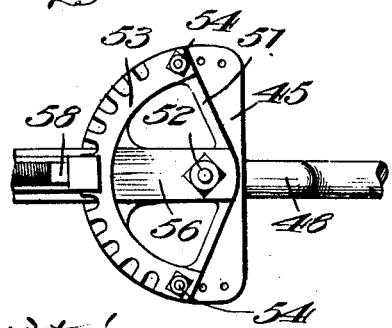

FRED M. ASHE, OF TARKIO, MISSOURI.

LEVER MECHANISM FOR CULTIVATORS.

945,361.

Specification of Letters Patent.　　Patented Jan. 4, 1910.

Application filed October 17, 1907. Serial No. 397,773.

*To all whom it may concern:*

Be it known that I, FRED M. ASHE, a citizen of the United States, residing at Tarkio, in the county of Atchison and State of Missouri, have invented certain new and useful Improvements in Lever Mechanisms for Cultivators and other Implements, of which the following is a specification.

One of the objects of this invention is to produce an improved lever mechanism for moving two parts independently or together.

Another object is to provide means whereby two levers may be so associated that one lever may actuate a movable element; a second lever may actuate a second movable element; and whereby one of these two levers which has previously worked independently may cause a synchronous actuation of both said levers.

Other objects and advantages of the invention will be apparent by reference to the following description when read in connection with the accompanying drawings, in which—

Figure 1 is a plan view of a two-row cultivator embodying my invention, the rear end of the seat supporting bars being broken away. Fig. 2 is a vertical sectional view through the cultivator on line 2—2 of Fig. 1. Fig. 3 is a perspective view illustrating part of the lever actuating mechanism. Fig. 4 is a sectional view of the lever mechanism for moving certain movable parts. Fig. 5 is a sectional view of a slightly modified form of the lever mechanism. Fig. 6 is a detail view of the last mentioned lever mechanism; and Fig. 7 is a view illustrating the connection between one of the lever mechanisms and a sway bar.

In order to illustrate the application of my invention, I have shown it as applied to a cultivator and the movable parts are represented as cultivator gangs, although it is obvious that the lever mechanism may be employed in other connections where certain adjustments of movable parts, both independently and collectively, are required.

As shown in the drawings, the cultivator comprises an axle 1, to the end of which the wheels 2 are connected in any suitable way. As shown, sleeves 3 are rigidly secured to the end of the axle 1 and are provided with bearings for the wheel spindles 4 upon which the wheels are rotatably mounted. An angle bar 5 is rigidly secured to the axle 1 by means of braces 6 and the rearwardly extending seat-supporting bars 7. The cultivator is shown as provided with tongues 8 secured to the axle 1 and the angle bar 5.

9 designates a seat supported by the bars 7 and upon which the operator may sit when accomplishing the adjustment of the movable parts pedally or by hand. The wheels are adapted to swing synchronously in a horizontal plane by means of a sway bar 10 pivotally connected at its ends to the arms 11 of the wheel spindles 4.

The cultivator is provided with beams carrying shovels, disks, or other earth working devices and these beams are designated A A and B B, that is, they are represented as being in pairs. The rear ends of the two beams of each pair may be connected by means of an arch bar 12.

13 designates brackets of which there are a plurality, two on each side of the seat supporting bars 7. Each bracket 13 supports a pivotally mounted crane 14, which engages the lugs 15 providing bearings for the rear end of said crane. The forward ends of said cranes are pivotally connected by arch bars 16 to which the beams A and B are attached. To the upper part of each arch bar 16 are rigidly connected two rearwardly extending bars 17 and 18. In this instance, the bars 17 and 18 constitute a frame extending rearwardly from the arch bar 16 for supporting the lever mechanism by means of which the height of the gangs may be adjusted. To the rear end of each bar 17 is fixed a segment 19 (Fig. 4) having a series of openings 20 therein. In one of the brackets 13 is pivotally mounted a crank arm 21, the free end of which extends loosely into the opening 22 in the attaching portion of the segment 19. In said segment is rotatably mounted a tubular shaft 23 having fixed thereto two sectors 24 and 25 lying at opposite sides of the relatively stationary segment 19. The sector 24 is pivoted to the shaft 23 by means of a bolt 26 so that it may be tilted in the direction of the length of the shaft. Upon the outer end of the tubular shaft is screwed a cap 27. A hand lever 28 is pivotally mounted on said shaft 23, said lever carrying a spring pressed locking detent 29 adapted to engage the teeth of the sector 24. The opening in the hand lever 29 through which the shaft 23 extends is large enough to permit said lever to be tilted toward the center of the machine in the direction of the arrow in Fig. 4. A lug 30 on said hand lever overlies the sector 24 so that when said lever is tilted in the direction of the arrow (Fig. 4), the sector also is tilted. A crank arm 31 fixed to the hand lever 28 is connected to the cultivator beam B. A rock shaft 32 is supported at one end in the tubular shaft 23 and at the other end in a bearing member 33 fixed to the rear end of the bar 18. A crank arm or crane corresponding to the crank arm 21 and pivotally mounted in the adjacent bracket 13 extends loosely through an opening in said bearing member 33. Upon the rock shaft 32 is fixed a hand lever 34 provided with a spring pressed detent 35 for engaging the teeth of the sector 25. To the opposite end of the shaft 32 is rigidly secured a crank arm 36 connected to the cultivator beam A. The sector 24 has fixed thereto a plurality of pins 37 adapted to enter any of the openings 20 in the stationary segment 19. The sector 24 is normally held with its pins 37 in engagement with the stationary segment 19 by means of a coiled spring 38 bearing at one end against a nut 39 fixed to the sector 24 and at its other end against a bent plate 40 overlying the segment 19. The beam A may be moved up and down independently of the beam B by releasing the detent 35 and rocking the hand lever 34, said hand lever, as heretofore stated, being rigidly secured to the rock shaft 32. The beam A may be locked in position by permitting the detent 35 to engage the teeth of the sector 25. The beam B may be moved vertically, independently of the beam A, by disengaging the detent 29 from the sector 24 and rocking the lever 28.

It will be understood that during the two operations just described, the sectors 24 and 25 are stationary, both of said sectors being secured to the tubular rock shaft 23 and both being prevented from turning because of the engagement of the pins 37 with the stationary segment 19.

When the operator desires to move up or down both of the gangs at one side of the machine, he tilts the hand lever 28 toward the center of the machine and without disengaging the detent 29 from the sector 24. The overlying lug or flange 30 upon the hand lever 28 causes the sector 24 to be tilted inwardly with said hand lever, withdrawing the pins 37 from the stationary segment 19. Both gangs may now be moved vertically by rocking the hand lever 28 while thus held tilted, since the engagement of the detent 29 with the sector 24 causes the sectors 24 and 25 to be moved with said lever, the hand lever 34 being locked to the sector 25 by the detent 35. In this instance, each of the beams A and B is connected to its crank arm 36 or 31 by means of a rod 41 attached at its upper end to said crank arm and extending loosely through a bar 42 fixed to the beam. The beam is carried by a pin or equivalent device secured to the lower end of the rod 41 below the bar 42. A coiled spring 43 is interposed between the bar 42 and a collar 44 fixed on the rod 41. The beam is thus yieldingly held to its work so that it may rise to clear obstructions.

The lever mechanism just described may be used for imparting an up and down movement to the parts to be moved as it is illustrated in Fig. 4. The mechanism as illustrated in Figs. 5 and 6 may have the same generic features, although the relative arrangement of the parts differs slightly from the mechanism shown in Fig. 4. The mechanism shown in Figs. 5 and 6 is for laterally moving the movable parts, as, for example, the gangs A and B.

Referring now to Figs. 5 and 6, 45 designates a segment having a series of openings 46 therein and rigidly connected to the sway bar 10 by means of two brackets 47. Said brackets lie at opposite sides of the crank 48 of a rock shaft 49 supported by the axle 1 and the angular bar 5 (Figs. 3 and 5). A clip 50 secured to the segment 45 embraces the crank 48. A sector 51 is pivotally mounted upon the bolt 52 that secures the clip 50 to the segment. A sector 53 is rigidly secured to the sector 51 by means of the posts 54. Between said sectors are the hand levers 55 and 56 for the sectors 51 and 53, respectively, said hand levers being mounted upon the bolt 52 to swing horizontally and vertically. To permit of such vertical pivotal movement of the levers 55 and 56 and the sectors 51 and 53, the openings through which the pivot bolt 52 extends are somewhat larger in diameter than said bolt as shown in Fig. 5. The hand levers 55 and 56 are provided with detents 57 and 58, respectively, to engage the teeth of the sectors 51 and 53. The said sectors are arranged to be locked rigidly to the stationary segment 45 by means of pins 59 fixed to the sector 51 and adapted to enter the openings 46 in said segment. The hand lever 55 is connected with the beams A and B at the right hand side of the operator by a link 60 attached to the bar 17 and the hand lever 56 with the beams A and B at the left hand side of the operator by a link 61 connected to the bar 17 at said last mentioned side of the operator. The sectors 51 and 53 are normally locked to the stationary segment 45 by means of a coiled spring 62 bearing at one end against a nut and washer on the bolt 52 and at its other end upon the hand lever 56. When the operator desires to move laterally the two gangs at his right hand side independently of the left hand gangs, he disengages the detent 57 from the sector 51 and moves the lever 55 in the appropriate direction; said gangs may be locked in adjusted position by means of the detent 57. When it is desired to shift the two left-hand gangs laterally independently of the right hand gangs, the operator releases the detent 58 and moves the hand lever 56 in the proper direction. When the operator wishes to shift all four gangs simultaneously to one side or the other, he raises the lowermost lever 55 to disengage the pins 59 from the segment 45, leaving said hand lever connected to the sectors 51 and 53 by means of the detent 57. Both hand levers may now be moved simultaneously through a movement of the lower one, said hand levers being locked together through the detents 57 and 58 and the sectors 51 and 53, which sectors it will be remembered are rigidly connected together.

63 designates two foot levers (Fig. 3) pivotally connected at their forward ends to brackets 64 secured to the seat supporting bars 7. At points between their ends the foot levers 63 are connected to the arms 65 fixed on the crank shaft 49 by means of links 66. When one of the foot levers 63 is depressed, the crank shaft 49 is rocked, the crank 48 of said shaft carrying with it the sway bar 10 and the segment 45, the sectors 51 and 53 and hand levers 55 and 56 attached to said sway bar. The lateral movement of the hand levers 55 and 56 is communicated to the cultivator gangs through the links 60 and 61. It will therefore be seen that the wheels 2 may be synchronously swung to one side or the other and the gangs may be moved to the same side by means of the foot levers 63.

It is obvious that the cultivator may be provided with suitable draft rigging and other appurtenances common to devices of like character, but as a specific form of cultivator forms no part of this invention, I deem it unnecessary to enter into a detail description thereof.

While I have shown the lever mechanism as applied to a cultivator in order to bring out its utility and mode of operation, it is obvious that the mechanism may be employed with devices other than cultivators. I, therefore, do not limit myself to its use with this specific art.

I claim as my invention:

1. The combination, with two parts to be moved, of two independently movable levers, each for moving one of said parts, a locking sector and a detent for each of said levers, said sectors being movable, and means for locking said sectors against movement.

2. The combination, with two parts to be moved, of two independently movable levers, a locking sector and a detent for each of said levers, said sectors being connected to rotate together, and means for locking said sectors against rotation.

3. The combination, with two parts to be moved, of two independently movable levers, each for moving one of said parts, a locking sector and a detent for each of said levers, said sectors being connected to rotate together, means for locking said sectors against rotation, and means connected to one of said levers for releasing said sectors from their locking members.

4. The combination, with two parts to be moved, of two independently movable levers, each for moving one of said parts, a locking sector and a detent for each of said levers, said sectors being arranged to rotate together, and means comprising a stationary segment for locking said sectors against rotation, one of said sectors being tiltable out of engagement with said segment.

5. The combination, with two parts to be moved, of a lever for moving one of said parts, a pivoted locking sector and a detent for said lever, means connecting said sector with the other part to be moved, and means for releasably locking said sector against rotation.

6. The combination, with two parts to be moved, of a lever for moving one of said parts, a pivoted locking sector and a detent for said lever, means connecting said sector with the other part to be moved, and a locking device for said sector, said sector being tiltable out of engagement with said locking device.

7. The combination, with a stationary segment, of a rock shaft mounted in said segment, two sectors fixed to said rock shaft on opposite sides of said segment, a locking pin on one of said sectors adapted to engage said segment, said sector being tiltable to withdraw said pin from said segment, a spring tending to hold said sector in engagement with said segment, a lever adapted to tilt said tiltable sector, a detent on said lever for said sector, a second lever, and a detent on said second lever engaging the other sector.

8. The combination, with a stationary segment, of a tubular rock shaft mounted in said segment, two sectors fixed to said rock shaft, a pin on one of said sectors adapted to engage said segment, said last mentioned sector being tiltable to withdraw said pin from said segment, a spring tending to hold said sector in engagement with said segment, a lever adapted to tilt said tiltable sector, a detent on said lever for said sector, a rock shaft supported at one end of said tubular rock shaft, means for supporting the other end of said rock shaft, a lever fixed to said last mentioned shaft, and a detent carried by said last mentioned lever adapted to engage the other sector.

9. The combination, with two operating devices, of a pivoted lever for moving one of said devices, a pivoted lever for moving the other of said devices, and a pivoted foot-lever for bodily moving said levers simultaneously.

10. The combination of two operating devices, a pivoted hand-lever for moving one of said devices, a pivoted hand-lever for moving the other of said devices, and a foot-lever for simultaneously and bodily moving both of said hand-levers.

11. The combination of two operating devices, a supporting member, a hand-lever pivotally mounted on said member for moving one of said operating devices, a hand-lever pivotally mounted on said member for moving the other of said operating devices, and a foot-operated means for moving said supporting member.

12. The combination of two operating devices, a lever for moving one of said devices, a lever for moving the other of said devices, a member upon which said levers are mounted, a crank shaft engaging said member, and means for rocking said crank shaft.

13. The combination of two operating devices, a lever for moving one of said devices, a lever for moving the other of said devices, a locking sector and a detent for said levers, said sectors being movable, a segment for locking said sectors against movement, and means for moving said segment.

14. The combination of two members to be moved, and means for moving them independently, comprising two levers, one for each member, means for releasably connecting said levers to move together, a frame, a rigid part carried by the frame, a portion of said connecting means being adapted to releasably engage the rigid part to hold one of said levers stationary when the other is moved.

15. The combination, with a stationary part having a plurality of locking openings therein, of a pivoted sector carrying a pin adapted to engage said openings, said sector being laterally tiltable to withdraw said pin from said openings, and a lever arranged to be locked by engagement with said sector.

16. The combination, with a stationary part having a plurality of locking openings therein, of a pivoted sector carrying a pin adapted to enter said openings, said sector being laterally tiltable to withdraw said pin from said openings; a lever arranged to be locked by engagement with said sector, said lever being laterally tiltable; and means on said lever engaging said sector for laterally tilting said sector.

17. The combination, with a stationary part, of a pivoted sector; means for locking said sector to said stationary part, said sector being laterally tiltable out of locking engagement with said stationary part; a laterally tiltable lever arranged to be locked by engagement with said sector; and means on said lever engaging said sector for laterally tilting it.

18. The combination, with a stationary segment, of a rock shaft mounted in said segment; two sectors fixed to said rock shaft on opposite sides of said segment; means for locking one of said sectors to said segment, said sector being tiltable out of locking engagement with said segment; a lever adapted to tilt said tiltable sector and arranged to be locked by engagement with said sector; and a lever arranged to be locked by engagement with the other sector.

19. The combination, with a stationary segment, of a tubular rock shaft mounted in said segment, two sectors fixed on said rock shaft on opposite sides of said segment; means for locking one of said sectors to said segment, said sector being tiltable out of locking engagement with said segment, a lever adapted to tilt said tiltable sector and arranged to be locked by engagement with said sector; a shaft rotatably supported in said tubular shaft; and a lever fixed to the second mentioned shaft and arranged to be locked by engagement with the other sector.

FRED M. ASHE.

Witnesses:
W. F. PRESTON,
W. H. NEELY.